United States Patent Office 3,504,437
Patented Apr. 7, 1970

3,504,437
METHOD OF MAKING CERAMIC ARTIFICIAL TEETH
Alfred R. Siegel, % Eigenmann, Templstrasse 1, Innsbruck, Austria
No Drawing. Filed July 19, 1966, Ser. No. 566,202
Int. Cl. A61c 13/00
U.S. Cl. 32—8                                    1 Claim

ABSTRACT OF THE DISCLOSURE

Ceramic artificial teeth are produced by the following steps: Fusing at 1400° C. a ceramic base material consisting of 56.7% $SiO_2$, 11.2% $Al_2O_3$, 2.5% $TiO_2$, 2.6% $B_2O_3$, 8.8% BaO, 2.9% CaO, 10.5% $K_2O$ and 4.8% $Na_2O$. The fused material is solidified by cooling and is then ground. The ground material is mixed with 0.15% of powdered titanium dioxide which contains no particles of more than 2 microns and contains 25–50% of particles of 0.3–0.6 micron. The resulting mixture is fritted at 800–880° C. for one hour and is then ground. The ground frit is mixed with 35% crystal quartz which is air-classified to a grain size of 5 microns and with 5% by weight of aluminum hydroxide gel containing 7.5% colloidal alumina. The resulting mixture is heated to a temperature of 780–840° C. and subsequently processed in a conventional manner to artificial teeth.

---

This invention relates to a process for obtaining improved optical characteristics in ornamental articles, such as glazed slabs, jewellery, trinketry, buttons, fancy articles and similar objects, imitating certain natural products, particularly gem stones which have not been successfully reproduced up to date. The invention also relates to products obtainable by this process.

The art of producing imitation jewellery, fancy articles and ornamental tiles for fireplaces and hearths is a very ancient one, and pictures were produced by joining together minute pieces of glass, or baked clay, of different colors. In more recent years, uses of similar techniques have multiplied and considerable progress was performed. Modern home decoration and countless new uses for fancy jewellery have created a quite manifest need for new materials having improved aesthetic effects which cannot be obtained by the classical materials: glass, a product made by fusion of suitable raw materials, and ceramics, a product obtained by forming a plastic mixture into shape and then compacting by firing.

Another technique, widely used in industrial practice, is the sintering process. Carefully prepared powdered mixtures are brought to temperatures which soften the mass, or part of it, and allow the particle to adhere between them and form solid objects after cooling. Very attractive articles can be obtained by this process and special original properties of added substances may be preserved and sometimes even enhanced.

By this technique, imitation jewellery has performed nootable progress and some very appreciated natural semi-precious stones have been nearly equated. Due to the fact that they frequently occur in a solid gel form, generally with considerable hardness and toughness, at the same time with a very appreciated effect of iridescence, it has been found that a similar lay-up had to be aimed at, and, as a matter of fact, considerable headway has been made in this direction.

Such bodies can be regarded as consisting of two different phases: a crystalline phase, represented by more or less fine particles which may have been added to the powder mixture or may have been generated during a firing process by chemical reaction or nucleation and a homogeneous, sometimes transparent or translucent glassy outer phase provided by the easier fusing components of the mixture. The finer the particles of the crystalline phase, the more takes the product the aspect and characteristics of a fine dispersion in solid state and the more it resembles naturally occurring rare minerals very much coveted for their physical and optical properties, such as hardness, toughness, resistance to wear, color, luster, etc. They owe their optical effect to the reflectance, transmission and absorption characteristics of the incident light, caused by their particular molecular structure.

It has now been found that a bright and colorful mineral body remindful of natural pearls can be obtained by setting a lattice of mineral particles in a suitable translucent medium, the diameter of the particles, together with their refractive index as well as the concentration, being responsible for the degree of bending and scattering of the incident light and for the wave length of the transmitted light. The same effect is obtained by very minute voids, although such fine air bubbles are very difficult to control. A number of grades regarding lucidity, translucency, iridescence and shine can be produced by imitating known crystal structures with similar effects. It has been known from the study of the behavior of mineral pigments in lacquers that the particle size, together with the index of refraction plays the most important role in the optical character of a coating and that grains of a diameter of 0.45 to 0.80 micron, is sufficiently different in refractive index against the continuous phase, as to produce a distinct hiding power, will show a degree of turbidity very much appreciated in the manufacture of quite a number of ceramic wares. This fact is generally explained by the selective absorption and the enormous scattering effect of small particles, the diameter of which is in the beforementioned range.

The present invention results in an additional and very decisive effect characterized in that natural luster, pearly look and lively brightness, found in natural semi-precious stones is brought about by forming a lattice of increased fineness or a lattice characterized by minute discontinuities and/or the steps described hereinafter, which are the conditions required for the rise of iridescence and pearly look according to this invention. This effect is caused by interference of bent light beams and their superposition and recombination, together with the extinction of beams differing in half a wave length and reminds of the phenomenon called Newton rings or mother of pearl.

In carrying out the process of the present invention, a mixture of powdered mineral with suitable chemical components is heated to a temperature, at which a chemical reaction with the formation of a viscous flux takes place. A substance of high refractivity, able to form a supersaturated solution with said flux at a predetermined temperature, is an integral part of the above mentioned mixture. By heat treatment, this supersaturated solution can be brought to separate fine seeds by nucleation. Said seeds can be allowed to grow to a desired size, to bring about a desired degree of turbidity and optical behavior.

A regular packing of seeds of similar size can be obtained and can be developed by controlled growth to the convenient diameter. As diffusion plays an important role in crystal growth, which must be held under strict control, it becomes essential to adjust the viscosity of the mass at the selected nucleation temperature within a narrow range. This can be attained by adding suitable amounts of e.g. boron oxide, aluminum oxide and calcium oxide. Among a number of substances showing a considerable difference in refractive index relative to the refraction of the matrix, titanium dioxide has been found to give the best results. It has the further advantage of being easily soluble in borosilicate glasses at melting temperature of about 1150° C. The solubility decreases markedly, however, at temperatures below 1000° C. and supersaturation causes nucleation to start already to a notable extent at about 900° C. From the curves drawn by Yee and Andrews (Journ. Am. Cer. Soc. 39,188 1956) it is clear that in order to obtain a rapid nucleation rate together with a low rate of growth, nucleation temperatures near 800° C. are necessary for a fine grained dispersion.

The process of the invention is applicable to obtaining fancy articles, trinkets, as well as industrial products, such as buttons, ornamental tiles, etc. It is also useful for covering ordinary as well as precious metals, which may be glazed or veneered, care being taken of the different coefficients of expansion to be matched. Another use is the preparation of artificial teeth, jacket crowns and other dental applications. The different maturing ranges of the various compositions used will require a careful study of the nucleation conditions, including the composition, viscosity, titanium dioxide saturation, seeding promotion, as well as temperature and time control.

The seeding promotion is an essential feature of the present invention. Very fine grained titanium dioxide if fritted together with the matrix under close control of temperature and time, a process which has to be repeated sometimes twice, will go into solution without leaving its place in the molecular structure of the glassy phase, forming separate areas of supersaturation. By heat treatment these areas will nucleate minute seeds and show surprising results as far as the described optical effects are concerned.

EXAMPLE 1

A suitable matrix for gold veneering is prepared by fusing at 1350° C. a mixture, which contains silica, boron oxide ($B_2O_3$), alumina, alkaline earth oxide and alkali metal oxides in a molecular ratio of 1.0:0.01:0.175:0.125:0.30 and contains 2.85% of titanium oxide. The mixture is ground and mixed with 0.2% fine grained commercial titanium dioxide, from which all particles having a size over 2 microns have been removed. The bulk of said fine grained titanium oxide—i.e. more than 30%—consists of particles having sizes of 0.3 to 0.6 micron. The mixture is then fritted at the temperature of 820° C. for 30 minutes, then ground and fritted again. The product thus fritted is ground to a fine powder and applied to the surface of a small sheet of jeweller's gold by mixing it with a few drops of water and condensing by vibration. After drying, it is placed in a furnace and brought to maturing temperature, applying vaccum until about 50° C. below the final temperature. After cooling the product, it will show a smooth, shining iridescence which cannot be obtained by other processes. If adjusted to the expansion characteristics of dental gold alloys, the same procedure is applicable to metal veneering in dentistry. The effect obtained is quite notable at considerable dilution with other fritted compositions, as may be necessary when different qualities or colors are desired.

EXAMPLE 2

A mixture leading to the composition consisting of

|  | Percent |
| --- | --- |
| $SiO_2$ | 56.7 |
| $Al_2O_3$ | 11.2 |
| $TiO_2$ | 2.5 |
| $B_2O_3$ | 2.6 |
| BaO | 8.8 |
| CaO | 2.9 |
| $K_2O$ | 10.5 |
| $Na_2O$ | 4.8 | is fused at 1400° C. and after solidification by cooling mixed with 0.15% of fine titanium oxide which contains no particles above 2 micron and 25 to 50% of particles of 0.3 to 0.6 micron. The resulting powder is fritted at 840° C. for one hour. It is ground again to pass ASTM No. 140 sieve, mixed with 4% dextrin and enough water, e.g. 4 to 12% by weight, to impart the plasticity required, if a special shape is to be built up, or put in a mold, dried and calcined to burn out the organic matter. The piece thus obtained is then trimmed and placed in a vacuum furnace at 500° C. and vacuum is applied while raising the temperature to 930° C. The temperature is then further raised up to 980° C. and held there for 1–3 minutes. The resulting object is now ready for setting in a metallic frame or on a support. It shows a pearly shine and a surprising iridescent brightness.

EXAMPLE 3

In order to prepare a mixture suitable for commercial tooth production, the ground frit described in the above Example 2 is mixed with 35% of crystal quartz, and carefully air-classified to a grain size of 5 microns. To the resulting powdered mixture in conventional manner mineral pigments are added to obtain the variously shaded mixtures called commonly core, gingival and incisal, which are intended to form the various layers of a tooth.

The powders are mixed with 0.5% dextrin and 5% of aluminum hydroxide gel (containing 7.5% colloidal alumina) which will give the proper plasticity for the preparation of teeth in conventional manner.

By the process of this example, artificial teeth, jacket crowns, inlays, and general work in dental prosthetics can be produced, and lustrous articles with an iridescence and pearly refulgence can be obtained.

A special effect can be obtained by uniformly mixing into the ground starting materials described in the above examples fine scales of mica, having diameters in the range of 0.5 to 0.15 mm. This special effect consists in a characteristic shine. Thus, in the above example, into the finished powder described 1–5% of mica scales are incorporated in order to obtain different grades.

The term "maturing temperature" used herein denotes a temperature at which the desired degree of sintering occurs. The parts and percent described herein are by weight if not otherwise stated.

In order to produce the formation of particles of the desired minute size, which are distinguished by a high index of refraction and a tendency to nucleation at increased temperatures, a matrix which through close control of composition and viscosity is adapted to allow dissolution without diffusion of the material of said particles and to cause the formation of separate supersaturated areas, is submitted to fritting, or repeated fritting, at adequate temperatures under close time control. Minute particles of a diameter between 0.1 and 0.4 micron, which are present in the surface layer of the finished articles in a concentration of 0.03% to 0.06% by weight, will then be formed by the steps described above. The term "matrix" denotes a physically homogeneous vehicle, in which particles of some different material can be embedded. The mineral bodies according to the present invention consist of ingredients in the following proportions:

|  | Percent |
| --- | --- |
| $SiO_2$ | 55–68 |
| $Al_2O_3$ | 8–12.5 |
| $TiO_2$ | 1.5–3.0 |
| $B_2O_3$ | 1.5–3.0 |
| BaO+CaO | 8.0–13.0 |
| $K_2O$ | 7.5–12.0 |
| $Na_2O$ | 3.6–7.5 |

The amount of minute particles of a diameter between 0.1 and 0.4 micron in the surface layer of the finished articles may be in the range between 0.02 to 0.10% calculated on the mineral body.

What is claimed is:

1. A method of producing ceramic artificial teeth, comprising preparing a ceramic base material by mixing and fusing at 1400° C. the following components: $SiO_2$ 56.7%, $Al_2O_3$ 11.2%, $TiO_2$ 2.5%, $B_2O_3$ 2.6%, BaO 8.8%, CaO 2.9%, $K_2O$ 10.5% and $Na_2O$ 4.8%; solidifying the fused base material by cooling, grinding the solidified material; mixing the resulting ground material with 0.15% of powdered titanium dioxide which contains no particles of a size more than 2 microns and contains 25–50% of particles of a size of 0.3–0.6 micron; fritting the resulting mixture at 800–880° C. for one hour and then grinding it; mixing the ground frit material with 35% crystal quartz air-classified to a grain size of 5 microns; mixing the resulting powder with 5% by weight of aluminum hydroxide gel containing 7.5% by weight of colloidal alumina and 0.5% dextrin; fritting and then grinding the resulting mixture; forming it into the shape of artificial teeth; and firing the resulting teeth to fuse together their particles.

References Cited

UNITED STATES PATENTS

| | | | |
|---|---|---|---|
| 2,663,658 | 12/1953 | Schurecht | 106—48 X |
| 2,686,131 | 8/1954 | Combs | 106—48 |
| 2,980,998 | 4/1961 | Coleman et al. | 106—45 X |
| 3,055,762 | 9/1962 | Hoffman | 106—49 |
| 3,138,475 | 6/1964 | Schroder et al. | 106—300 X |

FOREIGN PATENTS 1,111,775    7/1961    Germany.

OTHER REFERENCES

Norton, F. H.: Elements of Ceramics, Cambridge (Addison-Wesley Press), 1952, p. 184.

HELEN M. McCARTHY, Primary Examiner

W. R. SATTERFIELD, Assistant Examiner

U.S. Cl. X.R.

65—33; 106—39, 45